United States Patent [19]

Richwine

[11] 4,128,510

[45] Dec. 5, 1978

[54] VULCANIZING HALOGEN-CONTAINING POLYMERS

[75] Inventor: John R. Richwine, Newark, Del.

[73] Assignee: Hercules Incorporated, Wilmington, Del.

[21] Appl. No.: 788,395

[22] Filed: Apr. 18, 1977

[30] Foreign Application Priority Data

Jun. 28, 1976 [GB] United Kingdom ............... 26832/76

[51] Int. Cl.$^2$ ...................... C08F 28/00; C08G 59/00; C08G 59/14; C08K 5/47
[52] U.S. Cl. ......................................... 528/36; 526/17; 528/404
[58] Field of Search .................... 260/2 A, 79, 79.5 C, 260/79.5 P

[56] References Cited

U.S. PATENT DOCUMENTS

| 2,685,588 | 8/1954 | Gosborn et al. | 260/302 SD |
|---|---|---|---|
| 2,736,729 | 2/1956 | Krzikalla et al. | 260/302 |
| 2,760,933 | 8/1956 | Fields | 252/32.7 |
| 2,983,715 | 5/1961 | Fields | 260/79.5 C |
| 3,026,305 | 3/1962 | Robinson | 260/79.5 |
| 3,341,491 | 9/1967 | Robinson et al. | 260/79 |
| 3,357,956 | 12/1967 | Frazer | 260/79 |
| 3,700,650 | 10/1972 | Hani et al. | 260/79.5 C |
| 3,732,191 | 5/1973 | Nicholas | 260/79 |
| 3,898,203 | 8/1975 | Fath | 260/2 A |

FOREIGN PATENT DOCUMENTS 974915 10/1964 United Kingdom.

Primary Examiner—Herbert J. Lilling
Attorney, Agent, or Firm—Marion C. Staves

[57] ABSTRACT

Halogen-containing polymers can be crosslinked by heating with certain derivatives of 2,5-dimercapto-1,3,4-thiadiazole, such as the monobenzoate derivative, and a basic material to produce useful vulcanizates of increased strength and insolubility in organic solvents. Concentrates of the derivatives of 2,5-dimercapto-1,3,4-thiadiazole may be prepared by incorporating the thiadiazole in a binder material such as a polymer, wax, rosin, etc. for subsequent compounding with the halogen-containing polymer to be crosslinked.

19 Claims, No Drawings

VULCANIZING HALOGEN-CONTAINING POLYMERS

This invention relates to the crosslinking of halogen-containing polymers. More particularly this invention relates to a process of crosslinking halogen-containing polymers with certain derivatives of 2,5-dimercapto-1,3,4-thiadiazole and a basic material.

The mono- and dicarboxylic acid esters of 2,5-dimercapto-1,3,4-thiadiazole are known compounds and have been reported in the literature as light stabilizers (See U.S. Pat. No. 2,736,729) and lubricant additives (See U.S. Pat. No. 2,760,933), but not crosslinking agents. The use of 2,5-dimercapto-1,3,4-thiadiazole as a curing agent for certain unsaturated polymers has been reported in British Pat. No. 974,915. However, 2,5-dimercapto-1,3,4-thiadiazole tends to crosslink halogen-containing polymers prematurely (i.e. scorch) during processing, as during milling or storage prior to press-curing. Moreover, this agent can cause undesirable sticking to rolls and other processing equipment during mixing and curing. The derivatives employed in this invention are more soluble in, and so can be blended more effectively with the polymer to be crosslinked.

It has now been found that saturated and unsaturated halogen-containing polymers can be readily crosslinked without sticking or premature curing (i.e. scorching) when certain derivatives of 2,5-dimercapto-1,3,4-thiadiazole are used in the presence of certain basic materials in normal vulcanization procedures. Accordingly this invention relates to a process of crosslinking saturated and unsaturated halogen-containing polymers with a derivative of 2,5-dimercapto-1,3,4-thiadiazole represented by one of the following formulas:

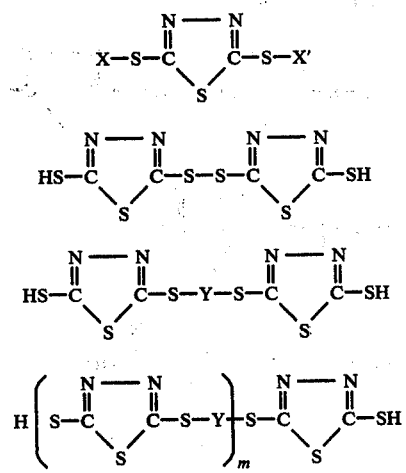

wherein X is hydrogen, —CRR'OH, —(CH$_2$—CH$_1$—O)$_n$H,

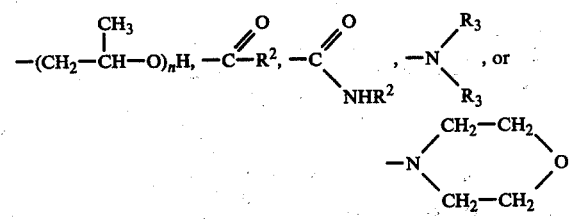

where m is 2 to 10; n is 1 to 5; R and R' are hydrogen, alkyl groups containing 1–8 carbon atoms, or aryl, alkaryl or aralkyl groups containing 6–8 carbon atoms; R$^2$ is an alkyl group containing 1–17 carbon atoms, an aryl group with one or two rings, an alkaryl group containing 7–14 carbon atoms, an aralkyl group containing 7–8 carbon atoms or a cyclohexyl group; and R$^3$ is an alkyl group containing 1–8 carbon atoms; X' can be the same as X with the exception of hydrogen; and wherein Y is zinc, lead, —CRR'—, —S—,

—SO$_2$—, —SS—,

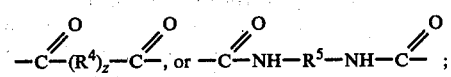

where R$^4$ is an alkylene or alkenylene group containing 1–8 carbon atoms, or a cycloalkylene, arylene or alkarylene group containing 6–8 carbon atoms; z is 0 or 1; and R$^5$ is an alkylene group containing 2–8 carbon atoms or a phenylene or methylphenylene or methylenediphenylene group in the presence of a basic metal oxide, hydroxide or salt.

It will be understood that the unsaturation in the above formulas is believed to exist in a state of equilibrium between two isomeric forms as follows:

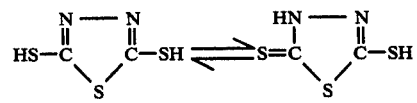

Typical of the derivatives of 2,5-dimercapto-1,3,4-thiadiazole which can be used in the process of this invention are 5-mercapto-2-S-methylol-1,3,4-thiadiazole, 5-mercapto-1,3,4-thiadiazolyl-2-thiomethyl hemiacetal, 5-mercapto-1,3,4-thiadiazolyl-2-thiooctyl hemiacetal, 5-mercapto-1,3,4-thiadiazolyl-2-thiophenyl hemiacetal, 5-mercapto-1,3,4-thiadiazolyl-2-thiophenethyl hemiacetal, 5-mercapto-1,3,4-thiadiazolyl-2-thio-o,m, or p-ethylphenyl hemiacetal, 2-hydroxy-2-thio(5-mercapto-1,3,4-thiadiazolyl)propane, 2-hydroxy-3-methyl-2-thio(5-mercapto-1,3,4-thiadiazolyl)pentane, 2-hydroxy-2-thio(5-mercapto-1,3,4-thiadiazolyl) decane, 1-hydroxy-1-phenyl-1-thio(5-mercapto-1,3,4-thiadiazolyl) ethane, 1-hydroxy-1-o,m, or p-tolyl-1-thio(5-mercapto-1,3,4-thiadiazolyl) ethane, 9-hydroxy-9-thio(5-mercapto-1,3,4-thiadiazolyl) heptadecane, 2-thio(5-mercapto-1,3,4-thiadiazolyl) ethanol, 14-thio(5-mercapto-1,3,4-thiadiazolyl)-3,6,9,12-tetraoxatetradecanol, 3-thio(5-mercapto-1,3,4-thiadiazolyl)propan-2-ol, 15-thio(5-mercapto-1,3,4-thiadiazolyl)-5,8,11,14-tetramethyl-4,7,10,13-tetraoxapentadecan-2-ol, 5-mercapto-1,3,4-thiadiazolyl-2-thiolacetate, 5-mercapto-1,3,4-thiadiazolyl-2-thiolstearate, 5-mercapto-1,3,4-thiadiazolyl-2-thiolbenzoate, 5-mercapto-1,3,4-thiadiazolyl-2-thiol-1-naphthoate, 5-mercapto-1,3,4-thiadiazolyl-2-thiol-phenylacetate, 5-mercapto-1,3,4-thiadiazolyl-2-thiolcinnamate, 5-mercapto-1,3,4-thiadiazolyl-2-thiol-p-toluate, 5-mercapto-1,3,4-thiadiazolyl-2-thiolcyclohexylcarboxylate, 5-mercapto-1,3,4-thiadiazolyl-2-N-methyl thiocarbamate, 5-mercapto-1,3,4-thiadiazolyl-2-N-η-octyl thiocarbamate, 5-mercapto-1,3,4-thiadiazolyl-2-N-phenyl thiocarbamate, N,N-dimethyl-2(5-mercapto-1,3,4-thiadiazolyl) sulfenamide, N,N-diη-octyl-2(5-mercapto- 1,3,4-thiadiazolyl) sulfenamide, N-t-butyl-2(5-mercapto-1,3,4-thiadiazolyl) sulfenamide, N-cyclohexyl-2(5-mercapto-1,3,4-thiadiazolyl) sulfenamide, N-oxydiethylene-2(5-mercapto-1,3,4-thiadiazolyl) sulfenamide, 5-mercapto-1,3,4-thiadiazolyl-2-disulfide, zinc(II) 5-mercapto-1,3,4-thiadiazolyl-2-mercaptide, lead(II) 5-mercapto-1,3,4-thiadiazolyl-2-mercaptide, bis(5-mercapto-1,3,4-thiadiazolyl-2thio)methane, 1,1-bis(5-mercapto-1,3,4-thiadiazolyl-2-thio)ethane, 1,1-bis(5-mercapto-1,3,4-thiadiazolyl-2-thio)nonane, α,α-bis(5-mercapto-1,3,4-thiadiazolyl-2-thio)-toluene, 1,1-bis(5-mercapto-1,3,4-thiadiazolyl-2-thio)-3-phenyl propane, 1,1-bis(5-mercapto-1,3,4-thadiazolyl-2-thio)-2-phenyl ethane, 2,2-bis(5-mercapto-1,3,4-thiadiazolyl-2-thio)propane, 9,9-bis(5-mercapto-1,3,4-thiadiazolyl-2-thio)heptadecane, 1,1-bis (5-mercapto-1,3,4-thiadiazolyl-2-thio)-2-phenyl ethane, bis(5-mercapto-1,3,4-thiadiazolyl-2) dithiocarbonate, 5-mercapto-1,3,4-thiadiazolyl-2-tetrasulfide, 5-mercapto-1,3,4-thiadiazolyl-2-trisulfide, bis(5-mercapto-1,3,4-thiadiazolyl-2-thio)sulfoxide, bis(5-mercapto-1,3,4-thiadiazolyl-2-thio)sulfone, bis(5-mercapto-1,3,4-thiadiazolyl)-2-thioloxalate, bis(5-mercapto-1,3,4-thiadiazolyl)-2-thiolmalonate, bis(5-mercapto-1,3,4-thiadiazolyl)-2-thiolsebacate, bis(5-mercapto-1,3,4-thiadiazolyl)-2-thiolfumarate, bis-(5-mercapto-1,3,4-thiadiazolyl)-2-thiolcyclohexyl-1,4-dicarboxylate, bis(5-mercapto-1,3,4-thiadiazolyl)-2thiolterephthalate, N,N'-ethylene-bis(5-mercapto-1,3,4-thiadiazolyl)-2-thiocarbamate, N,N'-1,8-octylene-bis(5-mercapto-1,3,4-thiadiazolyl)-2-thiocarbamate, N,N'-phenylene-bis(5-mercapto-1,3,4-thiadiazolyl)-2-thiocarbamate, N,N'-toluene-2,4-bis(5-mercapto-1,3,4-thiadiazolyl)-2-thiocarbamate, methylene-p,p'-N,N'-phenylene-bis(5-mercapto-1,3,4-thiadiazolyl) thiocarbamate, 2,5-bis-S-methylol-1,3,4-thiadiazole, 2,5-dithio-bis(1-hydroxy-1-ethyl)-1,3,4-thiadazole, 2,5-dithio-bis(1-hydroxy-1-nonyl)-1,3,4-thiadiazole, 2,5-dithio-bis(2-hydroxy-2-propyl)-1,3,4-thiadiazole, 2,5-dithio-bis(9-hydroxy-9-heptadecyl)-1,3,4-thiadiazole, 2,5-bis(15-thio-5,8,11,14-tetramethyl-4,7,10,13-tetraoxapentadecan-2-ol)-1,3,4-thiadiazole, 1,3,4-thiadiazolyl-2,5-dithiol-stearate, 1,3,4-thiadiazolyl-2,5-bis(N-methylthiocarbamate), 2,5-bis(N,N'-t-butyl)-1,3,4-thiadiazolyl disulfenamide, 2,5-bis(N,N'-cyclohexyl)-1,3,4-thiadiazolyl disulfenamide, 2,5,-bis(N,N-dimethyl)-1,3,4-thiadiazolyl disulfenamide, 2,5-bis(N,N-dioctyl)-1,3,4-thiadiazolyl disulfenamide, 2,5-bis(N-oxydiethylene)-1,3,4-thiadiazolyl disfulfenamide, and those derivatives of 2,5-dimercapto-1,3,4-thiadiazole having the following formulas:

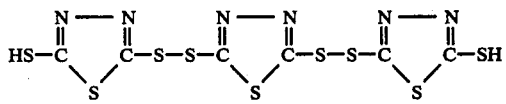

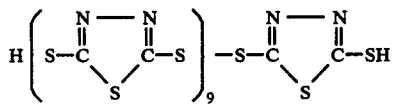

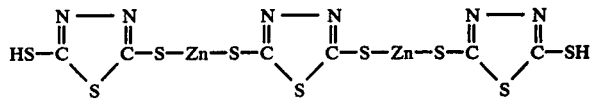

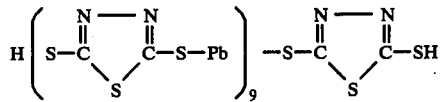

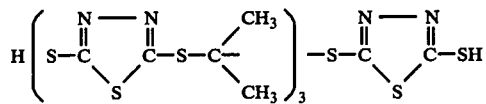

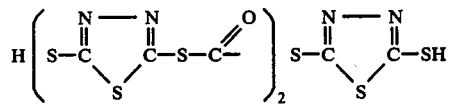

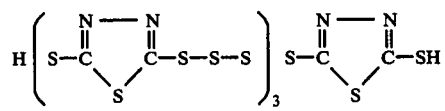

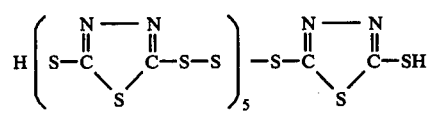

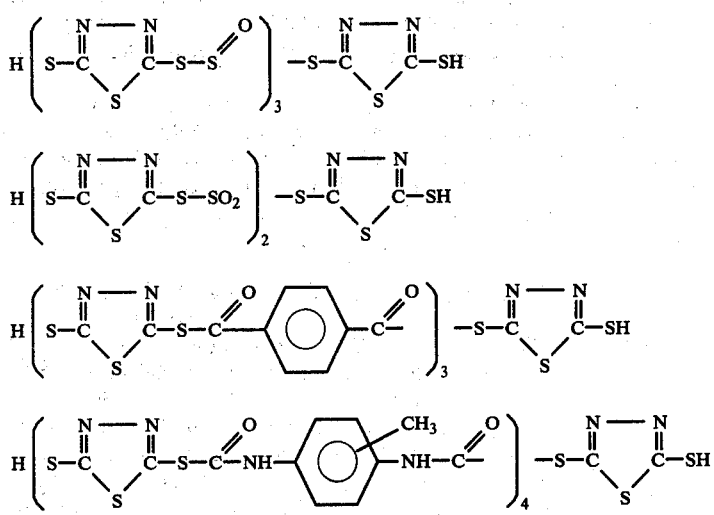

The monobenzoate and dibenzoate derivatives are particularly advantageous because they are easily prepared, easily handled, non-irritating, non-odorous, and particularly effective in the cross-linking.

Any saturated or unsaturated halogen-containing polymer, i.e. containing at least about 1% most preferably about 5% by weight of halogen, may be crosslinked in accordance with the process of this invention. Typical of the halogen-containing polymers are homopolymers of epichlorohydrin, copolymers of epichlorohydrin and ethylene oxide or propylene oxide, polychloroprene, chlorosulfonated polyethylnen, chlorinated high denisty polyethylene, polychloroalkylacrylates, poly(-vinyl fluoride), poly(vinyl chloride), poly (vinylidene chloride), chlorobutyl rubber and bromobutyl rubber.

In addition the process of this invention may be used to crosslink blends of haolgen-containing polymers or haolgen-containing polymers blended with nonhalogen-containing polymers. The only requirement is that there be sufficient halogen-containing polymer present in the blend to effect crosslinking.

Many of the halogen-containing polymers contain a small amount (i.e., from about 0.1% to about 2% by weight) of antioxidant, added at the time of their preparation. It may in some cases be desirable to add a small additional amount of antioxidant before or at the time of crosslinking the polymer. Exemplary of the most preferable antioxidants are phenyl- β-naphthylamine, di-β-naphthyl-p-phenylene-diamine, sym-di- β-napthyl-p-phenylenediamine, N-isooctyl-p-amino-phenol, the reaction product of diphenylamine and acetone, polymerized trimethyldihydroquinoline, 4,4'-thio-bis(6-tert.-butyl-m-cresol), the reaction product of crotonaldehyde and 3-methyl-6-tert.-butyl-phenol, nickel dibutyldithiocarbamate, the zinc salt of 2-mercapto-benzimidazole, and nickel dimethyldithiocarbamate.

A basic material or a material which will become basic on heating to the crosslinking temperature is required for use in conjunction with the derivative of 2,5-dimercapto-1,3,4-thiadiazole in the crosslinking process of this invention. Typical inorganic materials are basic metal oxides and hydroxides and their salts with weak acids, such as, for example, lead oxides, zinc oxide, magnesium oxide, calcium oxide, calcium hydroxide, barium oxide, zinc carbonate, lead acetate, barium carbonate, sodium phenoxide and sodium acetate.

It may be undesirable to use zinc oxide or zinc salts as the basic material in certain cases such as with chlorosulfonated polyethylene, chlorinated polyethylene, poly(vinyl chloride) or poly(vinylidene chloride), because zinc chloride formed in situ during the vulcanization process may cause undesirable degradtion by breaking of the polymer chain It may be desirable in the case of some of the halogen-containing polymers having relatively unrective halogens to use an accelerator of the well-known types containing aliphatic or aromatic amine or quaternary nitrogen groups. One particularly useful accelerator is the reaction product of buytraldehyde and aniline. The polymers with which it is desirable to use an accelerator include poly(vinyl chloride), chlorinated polyethylene, homopolymer of epichlorohydrin, poly(vinyl fluoride) and poly(vinylidene chloride).

In the case of epichlorohydrin polymers, it may be desirable to add a carboxylic acid to the crosslinkable composition to act as a scorch retarder during the compounding step when calcium oxide or calcium hydroxide are used as the basic material.

Varied amounts of the crosslinking agents can be added and the optimum amount of each crosslinking agent will depend upon the degree of crosslinking desired and the nature of the specific cross-linking agents employed. Generally, the amounts added (based on the weight of the polymer) will be within the following ranges: derivative of 2,5-dimercapto-1,3,4-thiadiazole, from about 0.1% to about 20%, preferably from about 0.5% to about 5.0%; basic material broadly from about 0.25% to about 50%, more preferably from about 0.5% to about 50%, most preferably from about 1.0% to about 20%; and accelerator (if one is used), broadly from about 0.01% to about 5%, more preferably from about 0.05% to about 5%, most preferably from about 0.1% to about 2%.

The crosslinking agents (and stabilizer if one is used) can be incorporated or admixed with the polymer in any desired fashion. For example, they can be uniformly blended with a polymer by simply milling on a conventional rubber mill or mixing in a Banbury mixer. By this means, the agents are uniformly distributed throughout the polymer and uniform crosslinking is effected when the blend is subjected to heat. It is generally preferably to mill at temperatures within the range of from about 70° F. to about 200° F. However, the blends, unless compounded with a large amount of accelerator, are highly scorch-resistant below about 250° F. Other methods of admixing the crosslinking agents with the polymer will be apparent to those skilled in the art.

The conditions under which the crosslinking is effected can be varied over a wide range. Crosslinking can be effected in minutes at elevated temperature or in days at temperatures slightly above room temperature (and in the presence of an accelerator). In general, the crosslinking temperature will be within the range of broadly from about 30° C. to about 280° C., more preferably from about 135° C. to about 235° C., and most preferably from about 150° C. to about 205° C. The time will vary inversely with the temperature and will range from about 30 seconds to 70 hours, preferably from 30 seconds to about 120 minutes. While the crosslinking process can be conducted in the air at normal atmospheric pressure, it will generally be conducted in a metal mold under a compression of at least about 500 p.s.i. or in a steam autoclave at the pressure required for the desired temperature.

In addition to the crosslinking agents, other ingredients can also be incorporated. The additives commonly used in rubber vulcanization can be used here also, as, for example, extenders, fillers, pigments, plasticizers, softenera, etc. The presence of a filler and, in particular, carbon black, is beneficial and, as in rubber compounding, gives very advantageous results. Obviously, there are many cases in which a filler is not required or desired and excellent results are achieved when only the crosslinking agents are added.

For ease in incorporating the 1,3,4-thiadiazole derivative in the crosslinkable polymer, and to avoid use of powders in the compounding step, it may be desirable to prepare the 2,5-dimercapto-1,3,4-thiadiazole derivative as a concentrate in a binder or carrier which can be added, along with the basic materials, in small amounts to the polymer composition without adverse effect on the properties of the crosslinked composition. Particularly advantageous binders or carriers are polymers which may or may not be crosslinkable by the crosslinking agent. Suitable materials, in addition to the crosslinkable polymers, are, for example, ethylene-propylene rubber, ethylene-propylene terpolymers, butadiene-styrene rubber, natural rubber, low density polyethylene, amorphous polypropylene and polyisobutylene. Concentrations of the dimercaptothiadiazole derivative can vary from 20% to 90%, preferably from about 30% to 75%. Other materials which cn advantageously be incorporated in the concentrates are accelerators, scorch retarders, antioxidants and non-basic fillers. The basic material should not be incorporated in the concentrate lest it decompose the thiadiazole derivative. These polymer concentrates are normally stored and used in the form of sheets, extruded pellets or rods. Other suitable binders or carriers for use in the preparation of such easily handled concentrates are waxes, resins, or other low-melting solids. Typical useful materials are paraffin wax, stearic acid, microcyrstalline wax, rosin, rosin esters and hydrocarbon resins.

This invention includes (1) the process of crosslinking halogen-containing polymers with the above described derivatives of 2,5-dimercapto-1,3,4-thiadiazole and at least one basic material; (2) the crosslinkable compositions comprising the halogen-containing polymers, derivatives of 2,5-dimercapto-1,3,4-thiadiazole and basic material; (3) the crosslinked composition resulting from the process of this invention; and (4) concentrates or dispersions of the cross-linkers in inert or crosslinkable polymers which are suitable for compounding into halogen-containing polymers which are to be crosslinked.

The following examples will illustrate the process of preparing the derivatives of 2,5-dimercapto-1,3,4-thiadiazole and their use in crosslinking halogen-containing polymers. All parts and percentages are by weight unless otherwise indicated.

EXAMPLE 1

This example illustrates the preparation of the monobenzoate derivative of 2,5-dimercapto-1,3,4-thiadiazole.

To a mixture of 2390 parts carbon disulfide and 250 parts sodium hydroxide dissolved in 750 parts water was slowly added 500 parts 65% aqueous hydrazine with agitation. The mixture was heated to reflux temperature (about 46°) and was held at this temperature for two hours, during which time gaseous hydrogen sulfide evolved. The temperature was then raised to 110° and held at this temperature with distillation of the unreacted carbon disulfide. On cooling to 35°, a yellow precipitate separated. About 300 parts acetone was added which caused solution of this precipitate. To this solution was added slowly over a period of eight hours 1450 parts of benzoyl chloride, while allowing the temperature to rise to about 60°. After cooling the precipitated product was removed by filtration, washed with warm water and acetone and dried. 1573 parts of the yellow product melting at 230° was recovered. Elemental analysis showed 42.5% carbon, 2.40% hydrogen, 10.9% nitrogen, 6.9% oxygen and 35.7% sulfur. Theoretical values for the monobenzoate derivative are 42.5% carbon, 2.36% hydrogen, 11.0% nitrogen, 6.37% oxygen and 37.8% sulfur.

EXAMPLE 2

This example illustrates the preparation of concentrates of the monobenzoate derivatives described in Example 1 in stearic acid or wax.

Each concentrate is prepared by dry blending the ingredients tabulated below, warming the concentrate blend to the melting point of the wax or stearic acid, extruding the melted concentrate blend and cutting the extrudate into rods or pellets.

| Ingredients | Parts A | B |
|---|---|---|
| Monobenzoate derivative of 2,5-dimercapto-1,3,4-thiadiazole described in Example 1 | 66.9 | 66.6 |
| Stearic Acid | — | 16.7 |
| Refined paraffin wax | 33 | — |
| Kaolin Clay | — | 7.5 |
| Polymeric plasticizer | — | 9.2 |
| 52891 03/08/78 788395 | 08-1800 1 102 | 16.00CH |
| Form | hard rods | soft pellets |
| Suggested use in crosslinking at X parts per hundred | polychloroprene 2 | epichlorohydrin copolymer 2.4 to 4.0 |

EXAMPLE 3

This example illustrates the preparation of the dibenzoate derivative of 2,5-dimercapto-1,3,4-thiadiazole.

Into a round-bottomed flask filled with an agitator, reflux condenser and a dropping funnel was placed 10 parts of 2,5-dimercapto--thiadiazole and 200 parts of tetrahydrofuran. To this solution was added 10.8 parts of pyridine, and 19.13 parts of benzoyl chloride was added dropwise. The mixture was refluxed on a steam bath for 1 hour, cooled to 25° C. and filtered. The recovered solid was washed with water to remove pyridine hydrochloride. More product was obtained by evaporating the tetrahydrofuran solution. The combined solids amounted to 22.3 parts. Elemental analysis showed 7.85% nitrogen and 26.65% sulfur. Theoretical values for the dibenzoate derivative are 7.83% nitrogen and 26.8 % sulfur.

EXAMPLE 4

This example illustrates the preparation of the monoacetate derivative of 2,5-dimercapto-1,3,4-thiadiazole.

To 15.5 parts of 2,5-dimercapto-1,3,4-thiadiazole dissolved in 100 parts of tetrahydrofuran was added slowly with stirrng over a period of about 10 minutes 15.7 parts of acetyl chloride, allowing the temperature of rise to 32°. Then 5 parts water was added causing the temperature to rise to 55°. About 100 parts water were then added causing separation of an oil. After evaporation of the solvent from the oil, it crystallized over a period of a week. The yellow crystals were washed with water and a small quantity of ethyl ether. After drying, 12.6 parts of material with a melting point of about 124° was obtained. Elemental analysis indicated that it was primarily the monacetate derivative.

EXAMPLE 5

This example illustrates the preparation of the oxalate bisester derivative of 2,5-dimercapto-1,3,4-thiadiazole having the formula

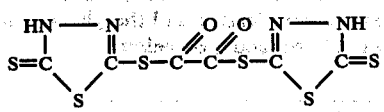

To 60 parts of 2,5-dimercapto-1,3,4-thiadiazole dissolved in 600 parts of diethyl ether and 200 parts of tetrahydrofuran was added over a period of 5 minutes with stirring 25.4 parts oxalyl chloride. Then 100 parts water was added slowly. The yellow solid which separated was removed by filtration, washed with water, ethyl ether and acetone and dried. The orange powder resulting was obtained in 53 parts. It analyzed 20.1% carbon, 15.5% nitrogen, 11.0% oxygen, and 55.3% sulfur compared with theroretical values of 20.3% carbon, 15.9% nitrogen, 9.0% oxygen and 54.2% sulfur.

EXAMPLE 6

This example illustrates the preparation of the monocinnamate ester derovatove pf 2,5-dimercapto-1,3,4-thiadiazole.

To 30 parts of 2,5-dimercapto-1,3,4-thiadiazole dissolved in 600 parts ethyl ether and 50 parts ethyl acetate were added 33.2 parts cinnamoyl chloride dissolved in 20 parts ethyl ether, slowly with stirring over a 30 minute period. After adding 100 parts water, cooling, filtering, washing the filtered solids with ethyl ether and drying, 11.4 parts of a yellow solid was obtained. It melted at 208° and analyzed 47.2% carbon, 2.9hydrogen, 10.1% nitrogen, 7.0% oxygen and 34.8% sulfur compared with theoretical values for the monocinnamate derivative of 47.1% carbon, 2.9% hydrogen, 10.0% nitrogen, 5.7% oxygen and 34.3% sulfur.

EXAMPLE 7 and 8

These examples illustrate the preparation of the lead and zinc salt derivatives of 2,5-dimercapto-1,3,4-thiadiazole.

Ten parts of 2,5-dimercapto-1,3,4-thiadiazole was dissolved in 100 parts of hot water and a hot aqueous solution containing 12.64 parts of lead acetate trihydrate was added. There was an immediate precipitation of the bright yellow lead salt derivative. The product analyzed 11.08% nitrogen and 38.0% sulfur compared with theoretical values for $C_2HN_2S_3$—Pb—$C_2HN_2S_3$ of 10.0% nitrogen and 32.9% sulfur.

The zinc salt derivative was prepared in a similar fashion from 10 parts of 2,5-dimercapto-1,3,4-thiadiazole and 9 parts of zinc chloride. The zinc salt derivative was white. The product analyzed 15.4% nitrogen and 52.8% sulfur compard with theoretical values for $C_2HN_2S_3$ — Zn — $C_2HN_2S_3$ of 12.9% nitrogen and 51.8% sulfur.

EXAMPLE 9

This example illustrates the use of the monobenzoate derivative of 2,5-dimercapto-1,3,4-thiadiazole, from Example 1, to crosslink an epichlorohydrin copolymer.

A masterbatch formulation of an equimolar copolymer of ethylene oxide and epichlorohydrin containing 24–26% chlorine, by weight and having a Mooney viscosity of 55, metal salt, carbon black, processing aid, antioxidants and plasticizers was compounded in a Banbury mixer. The masterbatch formulation had the following composition:

|  | Parts |
|---|---|
| Epichlorohydrin-ethylene oxide copolymer | 100 |
| Stearic Acid (processing aid) | 0.5 |
| High Abrasion Furnace Carnon Black | 40 |
| Medium Thermal Carbnon Black | 60 |
| Nickel Demethyldithiocarbamate (antioxidant) | 1.0 |
| Nickel Dibutyldithiocarbamate (antioxidant) | 1.0 |
| Polymeric Polyester Plasticizer | 7.0 |
| Barium Carnonate | 7.0 |

Two portions of the above masterbatch formulation were compounded on a two-roll mill with crosslinking agents. The first portion was compounded with the monobenzoate derivative prepared in Example 1. The second portion was compounded with 2,5-dimercapto-1,3,4-thiadiazole (as a comparator). The first portion processed satisfactorily on the two-roll mill. The second portion (i.e. comparator) was very sticky and difficult to process on the two-roll mill, showing that such a formulation could not be processed on a large scale commercial mill because of excessive sticking.

Samples of each portion were crosslinked by heating for 20 minutes at a temperature of 160° C. in a steam autoclave and their physical properties determined. The part of crosslinker used and the physical properties are tabulated below:

|  | First Portion | Second Portion |
|---|---|---|
| Masterbatch (parts) | 100 | 100 |
| 2,5-Dimercapto-1,3,4-thiadiazole (parts) |  | 0.48 |
| Monobenzoate derivative (parts) | 0.83 |  |
| Tensile strength (p.s.i.) | 1420 | 1320 |
| % Elongation | 300 | 280 |
| 100% Modulus (p.s.i.) | 630 | 650 |
| Shore A Hardness | 72 | 73 |
| Mooney scorch (at 121° C.)* |  |  |
| Minimum viscosity | 48 | 51 |

-continued

|  | First Portion | Second Portion |
|---|---|---|
| Time in minutes for 3 point rise in viscosity | 13.8 | 7.6 |
| Time in minutes for 5 point rise in viscosity | 19.0 | 9.5 |

*American Standard Testing Method D 1646-68

The data in the above tabulaion show that while the physical properties of the crosslinked samples were essentially comparable, the scorch properties of the second portion are excessive and impractical for commercial applications.

EXAMPLE 10

This example illustrates the use of a predispersion of the monobenzoate derivative of Example 1 in crosslinking an epichlorohydrin copolymer.

A predispersion concentrate of the monobenzoate derivative having the following composition was prepared:

|  | Percent by Weight |
|---|---|
| Monobenzoate derivative (prepared in Example 1) | 71.4 |
| Terephthalic Acid | 4.3 |
| Sorbitol Monostearate | 0.6 |
| Ethylene-propylene copolymer rubber* | 20 |
| Paraffinic oil plasticizer | 3.7 |

*Sold under the trade name Vistalon 404

To 100 parts of the masterbatch described in Example 9 was added 1.14 parts of the predispersion concentrate and the blend compounded on a two-roll mill. The blend exhibited excellent processing properties. The resulting formulation was crosslinked by heating for 20 minutes at 160° C. in a steam autoclave. The crosslinked product had a tensile strength of 1340 p.s.i., % elongation of 300, 100% modulus of 610 p.s.i. and a Shore A hardness of 69. Mooney scorch resistance (measured at 121° C.) was 16.0 minutes for a 3 point rise in viscosity and 23 minutes for a 5 point rise in viscosity.

EXAMPLE 11

This example illustates the crosslinking of polychloroprene in accordance with the process of this invention.

A masterbatch formulation of a polychloroprene elastomer containing 39% chlorine by weight (sold under the trade name Neoprene W by DuPont), carbon black, extender oil and antioxidant was compounded in a Banbury mixer. The masterbatch formulation of the following composition:

|  | Parts |
|---|---|
| Polychloroprene | 100 |
| Semi-reinforcing furnace carbon black | 58 |
| Aromatic oil extender | 12 |
| Phenyl-α-naphthylamine (antioxidant) | 2.0 |

A portion of a masterbatch formulation was compounded on a two-roll mill with the crosslinking agents and then crosslinked by heating at 153° C. for thirty minutes in a oscillating disc rheometer (American Standard testing method D 2705-68T. The parts of crosslinker used and the physical properties are tabulated below.

| Masterbatch (parts) | 100 |
|---|---|
| Monobenzoate derivative prepared in Example 1 (parts) | 0.87 |
| Barium Carbonate (parts) | 2.91 |
| Oscillating Disc Rheometer at 153° C. |  |
| Time to 1 inch-pound rise (sec.) | 102 |
| Minimum Torque (inch-pounds) | 10 |
| Maximum Torque (inch-pounds) | 76 |
| Time to 90% of maximum torque (minutes) | 30.5 |
| Physical Properties |  |
| tensile strength (p.s.i.) | 2865 |
| Elongation (%) | 400 |
| 100% Modulus (p.s.i.) | 455 |
| Shore A Hardness | 59 |

EXAMPLE 12

This example illustrates the use of an accelerator in the crosslinking process of this invention.

A masterbatch formulation of the equimolar copolymer of ethylene oxide and epichlorohydrin described in Example 9, carbon black, metal salt, antistatic agent, and antioxidant was compounded in a Banbury mixer. The masterbatch formulation had the following composition.

|  | Parts |
|---|---|
| Epichlorohydrin-ethylene oxide copolymer | 100 |
| Stearic acid (processing aid) | 1.5 |
| Fast extruding furnace carbon black | 40 |
| Nickel dimethyldithiocarbamate | 1.0 |
| Barium carbonate | 7.5 |

A portion of the masterbatch formulation was compounded on a two-roll mill with the crosslinking agent and accelerator and then crosslinked by heating at 160° C. in a press for 30 minutes under pressure. The parts of crosslinker and accelerator and the physical properties of the product are tabulated below:

| Masterbatch (parts) | | 100 |
|---|---|---|
| Butyraldehyde-anilene reaction product-accelerator (parts) | | 0.13 |
| Monobenzoate derivative prepared in Example 1 (parts) | | 1.65 |
| Physical Properties | | |
| Tensile Strength (p.s.i.) | | 1840 |
| Elongation (%) | | 300 |
| 100% Modulus (p.s.i.) | 835 | |
| Shore A Hardness | | 71 |
| Compression Set (% after 70 hours at 150° C.) | | 55 |
| Properties after Air Aging at 150° C. for | 168 hours | 240 hours |
| Tensile Strength (p.s.i.) | 1300 | 1095 |
| Elongation (%) | 140 | 150 |
| 100% Modulus (p.s.i.) | 1000 | 870 |
| Shore A Hardness | 73 | 73 |

EXAMPLE 13

This example illustrates the crosslinking of a bromine containing polymer in accordance with the process of this invention.

A masterbatch formulation of brominated poly(isobutyleneisoprene) elastomer, "Bromobutyl" containing 1.5% bromine by weight (sold by Polymer Corporation Ltd.), carbon black, processing aid, and metal oxides was compounded in a Banbury mixer. The masterbatch formulation had the following composition:

|  | Parts |
|---|---|
| Brominated butyl elastomer | 100 |

-continued

| | Parts |
|---|---|
| High abrasion furnace carbon black | 50 |
| Stearic acid (processing aid) | 1.0 |
| Magnesium oxide | 1.0 |
| Zinc oxide | 5.0 |

A portion of the masterbatch formulation was compounded on a two-roll mill with the crosslinking agent and accelerator and then crosslinked by heating at 153° C. for thirty minutes in an oscillating disc rheometer (American Standard Testing Method D 2705-68T). The parts of crosslinker and accelerator used and the physical properties are tabulated below:

| | Parts |
|---|---|
| Masterbatch (parts) | 100 |
| Benzothiazyldisulfide (acccelerator) (parts) | 0.66 |
| Monobenzoate derivative prepared in Example 1 (parts) | 1.65 |
| Oscillating Disc Rheometer at 153° C. | |
| Time to 1 inch-pound rise (sec.) | 85 |
| Minimum Torque (inch-pounds) | 22 |
| Torque after 30 minutes (inch-pounds) | 85.5 |

EXAMPLE 14

This example illustrates the crosslinking of chlorinated polyethylene in accordance with the process of this invention.

A masterbatch formulation of chlorinated polyethylene containing 36% chlorine by weight (sold by Dow Chemical Company), carbon black, stabilizer, plasticizer and antioxidant was compounded in a Banbury mixer. The masterbatch formulation had the following composition:

| | Parts |
|---|---|
| Chlorinated polyethylene | 100 |
| Semi-reinforcing furnace carbon black | 85 |
| Magnesium oxide (stabilizer) | 4 |
| Dioctyl adipate (plasticizer) | 15 |
| Polymerized 2,2,4-trimethyl-1,2-dihydroquinoline (antioxidant) | 0.1 |

A portion of the masterbatch formulation was compounded on a two-roll mill with the crosslinking agents and accelerator and then crosslinked by heating at 160° C. for thirty minutes in an oscillating disc rheometer (American Standard Testing Method D 2705-68T). The parts of crosslinker and accelerator used and the physical properties are tabulated below.

| | |
|---|---|
| Masterbatch (parts) | 100 |
| Monobenzoate derivative prepared in Example 1 (parts) | 2.5 |
| Calcium hydroxide (parts) | 1.0 |
| Di-ortho-tolyl guanidine accelerator (parts) | 1.0 |
| Oscillating Disc Rheometer at 160° C. | |
| Time to 1 inch-pound rise (sec.) | 310 |
| Minimum torque (inch-pounds) | 19 |
| Torque after 30 minutes (inch-pounds) | 92.5 |
| Time to 90% of maximum torque (minutes) | 29 |

EXAMPLES 15–24

These examples illustrate the use of various derivatives of 2,5-dimercapto-1,3,4-thiadiazole to crosslink an epichlorohydrin copolymer.

A masterbatch formulation of the copolymer of ethylene oxide and epichlorohydrin described in Example 9, carbon black, processing aid, antioxidant, accelerator, and basic material was compounded in a Banbury mixer. The masterbatch formulation had the following composition:

| | Parts |
|---|---|
| Epichlorohydrin-ethylene oxide copolymer | 100 |
| Stearic acid (processing aid) | 1.0 |
| Fast extruding furnace carbon black | 40 |
| Nickel dimethyldithiocarbamate (antioxidant) | 1.0 |
| Butyraldehyde-aniline reaction product (accelerator) | 0.25 |
| Barium carbonate (basic material) | 8.0 |

Portions of the masterbatch formulation were compounded on a two-roll mill with the following derivatives of 2,5-dimercapto-1,3,4-thiadiazole and then crosslinked by heating at 160° C. for 30 minutes in an oscillating disc rheometer (American Standard Testing Method D 2705-68T). The parts of derivative used and the physical properties are tabulated in Table I.

TABLE I

| Example | Derivative | Parts | | | | | | | | | |
|---|---|---|---|---|---|---|---|---|---|---|---|
| | Masterbatch | 100 | 100 | 100 | 100 | 100 | 100 | 100 | 100 | 100 | 100 |
| 15 | Diacetate | 1.5 | — | — | — | — | — | — | — | — | — |
| 16 | Monocaproate | — | 1.7 | — | — | — | — | — | — | — | — |
| 17 | Monostearate | — | — | 2.8 | — | — | — | — | — | — | — |
| 18 | Distearate | — | — | — | 4.5 | — | — | — | — | — | — |
| 19 | Monohexahydrobenzoate | — | — | — | — | 1.7 | — | — | — | — | — |
| 20 | Monobenzoate | — | — | — | — | — | 1.7 | — | — | — | — |
| 21 | Dibenzoate | — | — | — | — | — | — | 2.3 | — | — | — |
| 22 | Dithiocarbonate | — | — | — | — | — | — | — | 1.1 | — | — |
| 23 | bis-Adipate | — | — | — | — | — | — | — | — | 1.3 | — |
| 24 | bis-Terephthalate | — | — | — | — | — | — | — | — | — | 1.4 |

| | Physical Properties Examples | | | | | | | | | |
|---|---|---|---|---|---|---|---|---|---|---|
| | 15 | 16 | 17 | 18 | 19 | 20 | 21 | 22 | 23 | 24 |
| Mooney scorch (Δ 5 at 121° - minutes) | 10 | 9 | 10 | 12 | 9 | 97 | 11 | 8 | 9 | 9 |
| Oscillating Disc Rheometer at 160° C. | | | | | | | | | | |
| Time for 1 inch-pound rise (sec.) | 100 | 82 | 102 | 115 | 82 | 82 | 105 | 60 | 82 | 79 |
| Minimum torque (inch-pounds) | 11.7 | 11.5 | 12.0 | 10.0 | 12.0 13.0 12.0 14.0 | 13.8 | 13.0 | | | |
| Maximum torque (inch-pounds) | 105 | 97 | 85 | 85 | 98 | 106 | 99 | 97 | 106 | 97 |
| Time to 90% maximum torque (minutes) | 16 | 12 | 16 | 24 | 12 | 12 | 14 | 8 | 9 | 9 |

EXAMPLES 25–26

These examples illustrate the use of other derivatives of 2,5-dimercapto-1,3,4-thiadiazole to crosslink an epichlorohydrin copolymer.

Portions of the masterbatch formulation described in Examples 15-24 were compounded on a two-roll mill with the following derivatives of 2,5-dimercapto-1,3,4-thiadiazole and then crosslinked by heating at 160° C. for 30 minutes in an oscillating disc Rheometer (American Standard Testing Method D 2705-68T). The parts of derivative used and the physical properties are tabulated in Table II.

TABLE II

| Example | Derivative Masterbatch | Parts | |
|---|---|---|---|
| | | 100 | 100 |
| 25 | Monothiocinnamate | 1.9 | — |
| 26 | bis-Thiooxalate | — | 1.2 |

Physical Properties

| | Examples | |
|---|---|---|
| | 25 | 26 |
| Mooney scorch (Δ 5 at 121° - minutes) | 25 | 20 |
| Oscillating Disc Rheometer at 160° C. | | |
| Time for 1 inch-pound rise (sec.) | 220 | 180 |
| Minimum torque (inch-pounds) | 14 | 9 |
| Torque at 30 minutes (inch-pounds) | 105.5 | 112 |
| Torque at 60 minutes (inch-pounds) | 107.0 | 116 |

EXAMPLES 27–33

These examples illustrate the use of various basic materials in the crosslinking of an epichlorohydrin copolymer.

A masterbatch formulation of the copolymer of ethylene oxide and epichlorohydrin described in Example 9, carbon black, processing acid, and antioxidants was compounded in a Banbury mixer. The masterbatch formulation had the following composition:

| | Parts |
|---|---|
| Epichlorohydrin-ethylene oxide copolymer | 100 |
| High abrasion furnace carbon black | 30 |
| Semi-reinforcing furnace carbon black | 70 |
| Dioctyl phthalate (processing aid) | 10 |
| Nickel dimethyldithiocarbamate (antioxidant) | 1.0 |
| Nickel dibutyldithiocarbamate (antioxidant) | 1.0 |

Portions of the masterbatch formulation were compounded on a two-roll mill with 2 parts of the monobenzoate derivative of 2,5-dimercapto-1,3,4-thiadiazole (described in Example 1) per 100 parts of copolymer and the following basic materials and then crosslinked by heating at 160° C. for 30 minutes in an oscillating disc Rheometer (American Standard Testing Method D 2705-68T). The parts of basic material used and the physical properties are tabulated in Table III.

TABLE III

| Example | Basic Material Masterbatch | Parts | | | | | | |
|---|---|---|---|---|---|---|---|---|
| | | 100 | 100 | 100 | 100 | 100 | 100 | 100 |
| 27 | Barium oxide | 2.4 | — | — | — | — | — | — |
| 28 | Barium sulfide | — | 3.8 | — | — | — | — | — |
| 29 | Calcium oxide | — | — | 0.9 | — | — | — | — |
| 30 | Calcium nitride | — | — | — | 1.9 | — | — | — |
| 31 | Calcium sulfide | — | — | — | — | 7.5 | — | — |
| 32 | Sodium acetate | — | — | — | — | — | 1.9 | — |
| 33 | Sodium phenoxide | — | — | — | — | — | — | 1.9 |

Physical Properties

| | Examples | | | | | | |
|---|---|---|---|---|---|---|---|
| | 27 | 28 | 29 | 30 | 31 | 32 | 33 |
| Mooney scorch (Δ5 at 121°-minutes) | 1.6 | 6.7 | 7.0 | 3.5 | 19.8 | 3.5 | 1.5 |
| Oscillating Disc Rheometer at 160° C. | | | | | | | |
| Time for 1 inch-pound rise (sec.) | 15 | 150 | 100 | 20 | 220 | 40 | 10 |
| Minimum torque (inch-pounds) | 18 | 11 | 16 | 10 | 10 | 10 | 14 |
| Maximum torque (inch-pounds) | 166 | 110 | 110 | 170 | 113 | 105 | 120 |
| Time to full cure (min.) | 30 | 35 | 35 | 30 | 35 | 45 | 25 |

EXAMPLES 34–37

These examples illustrate the crosslinking of various halogenated polymers in accordance with this invention but without the use of carbon black, processing aids, plasticizers or antioxidants.

Each formulation was compounded on a two-roll mill. The formulations had the following composition:

| Ingredients | 34 | 35 | 36 | 37 |
|---|---|---|---|---|
| Epichlorohydrin homopolymer containing 38.5% chlorine by wt. | 100 | — | — | — |
| Epichlorohydrin–ethylene oxide copolymer as described in Example 9 | — | 100 | — | — |
| Chlorosulfonated polyethylene containing 27% chlorine by wt. | — | — | 100 | — |
| Chlorinated polyethylene containing 36% chlorine by wt. | — | — | — | 100 |
| Barium carbonate | 7.5 | 7.5 | — | — |
| Magnesium oxide | — | — | 5 | 5 |
| Monobenzoate derivative of Example 1 | 1.5 | 1.5 | 1.5 | 1.5 |
| Butyraldehyde-aniline reaction product-accelerator | 0.5 | — | — | 0.5 |

Each formulation was crosslinked by heating at 160° C. for 30 minutes in an oscillating disc Rheometer (American Standard Testing Method D 2705-68T). The physical properties of the crosslinked products are tabulated below.

| | 34 | 35 | 36 | 37 |
|---|---|---|---|---|
| Minimum torque (inch-pounds) | 10 | 13 | 6.5 | 26 |
| Time for 1 inch-pound rise (sec.) | 75 | 135 | 645 | 210 |
| Torque at 60 minutes (inch-pounds) | 50 | 51.5 | 34 | 53 |
| Time to 95% cure (minutes) | 12 | 26.5 | 55 | 52 |

What I claim and desire to protect by Letters Patent is:

1. The process of crosslinking a halogen-containing polymer which consists essentially of heating said polymer in the presence of a basic material and a derivative of 2,5-dimercapto-1,3,4-thiadiazole selected from those derivatives having one of the following formulas:

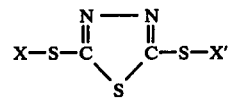

-continued

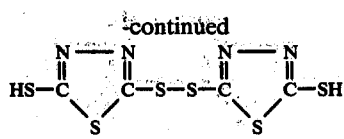

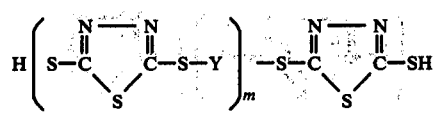

wherein X is a substituent selected from hydrogen, —CRR'OH, —(CH$_2$—CH$_2$—O)$_n$H,

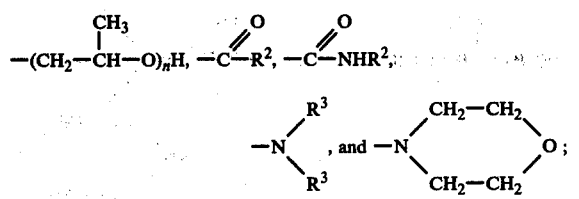

where n is an integer from 1 to 5, R and R' are selected from hydrogen, alkyl groups containing 1–8 carbon atoms, and aryl, alkaryl and aralkyl groups containing 6 to 8 carbon atoms; R$^2$ is selected from alkyl groups containing 1–17 carbon atoms, aryl groups containing one to two rings, alkaryl groups containing 7–14 carbon atoms, aralkyl groups containing 7–8 carbon atoms and cyclohexyl groups; R$^3$ is an alkyl group containing 1–8 carbon atoms; X' is the same as X with the exception of hydrogen; m is an integer from 1 to 10; and Y is selected from zinc, lead, —CRR'—, —CO—, —S—,

—SO$_2$—, —SS—,

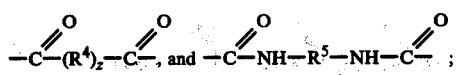

where R$^4$ is selected from alkylene and alkenylene groups containing 1–8 carbon atoms and cycloalkylene, arylene and alkarylene groups containing 6–8 carbon atoms; z is 0 or 1; and R$^5$ is selected from alkylene groups containing 2–8 carbon atoms, phenylene, methylphenylene and methylenediphenylene.

2. The process of claim 1 wherein the said derivative of 2,5-dimercapto-1,3,4-thiadiazole is the monobenzoate derivative.

3. The process of claim 1 wherein the said derivative of 2,5-dimercapto-1,3,4-thiadiazole is the dibenzoate derivative.

4. The process of claim 1 wherein the said basic material is a basic metal oxide.

5. The process of claim 4 wherein the basic metal oxide is magnesium oxide.

6. The process of claim 1 wherein the said basic material is a basic metal salt.

7. The process of claim 6 wherein the basic metal salt is barium carbonate.

8. The process of claim 1 wherein the said basic material is a basic metal hydroxide.

9. The process of claim 8 wherein the basic metal hydroxide is calcium hydroxide.

10. The process of claim 1 wherein the halogen-containing polymer is a polymer of epihalohydrin.

11. A halogen-containing polymer crosslinked by heating in the presence of a basic material and a derivative of 2,5-dimercapto-1,3,4-thiadiazole selected from those derivatives having one of the following formulas:

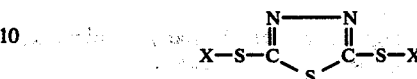

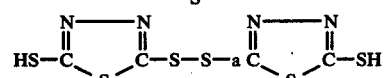

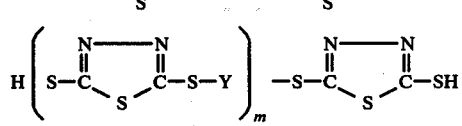

wherein X is a substituent selected from hydrogen, —CRR'OH, —(CH$_2$—CH$_2$—O)$_n$H,

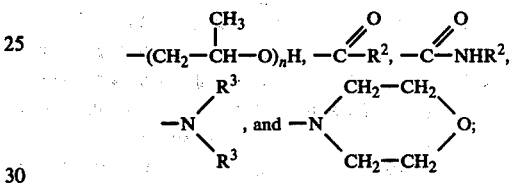

where n is an integer from 1 to 5, R and R' are selected from hydrogen, alkyl groups containing 1–8 carbon atoms, and aryl, alkaryl and aralkyl groups containing 6 to 8 carbon atoms; R$^2$ is selected from alkyl groups containing 1–17 carbon atoms, aryl groups containing one to two rings, alkaryl groups containing 7–14 carbon atoms, aralkyl groups containing 7–8 carbon atoms and cyclohexyl groups; R$^3$ is an alkyl group containing 1–8 carbon atoms; X' is the same as X with the exception of hydrogen; m is an integer from 1 to 10; and Y is selected from zinc, lead, —CRR'—, —CO—, —S—,

—SO$_2$—, —SS—,

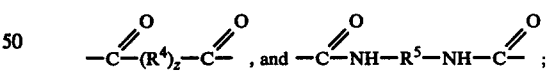

where R$^4$ is selected from alkylene and alkenylene groups containing 1–8 carbon atoms and cycloalkylene, arylene and alkarylene groups containing 6–8 carbon atoms; z is 0 or 1; and R$^5$ is selected from alkylene groups containing 2–8 carbon atoms, phenylene, methylphenylene and methylenediphenylene.

12. The product of claim 11 wherein said halogen-containing polymer is an epihalohydrin polymer.

13. The process of claim 1 wherein the said derivative of 2,5-dimercapto-1,3,4-thiadiazole has the formula

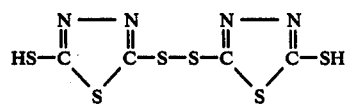

14. The process of claim 1 wherein the said derivative of 2,5-dimercapto-1,3,4-thiadiazole has the formula

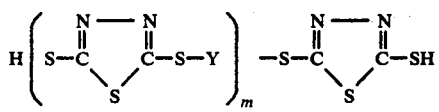

wherein m is an integer from 1 to 10; and Y is selected from zinc, lead, —CRR'—, —CO—, —S—,

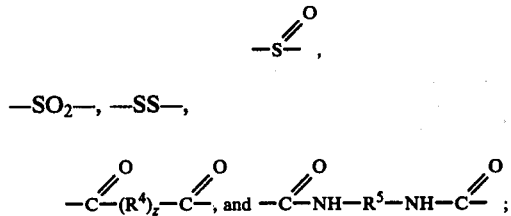

where $R^4$ is selected from alkylene and alkenylene groups containing 1-8 carbon atoms and cycloalkylene, arylene and alkarylene groups containing 6-8 carbon atoms; z is 0 or 1; and $R^5$ is selected from alkylene groups containing 2-8 carbon atoms, phenylene, methylphenylene and methylenediphenylene.

15. The process of claim 1 wherein the halogen-containing polymer is polychloroprene.

16. The process of claim 1 wherein the halogen-containing polymer is chlorinated high density polyethylene.

17. The product of claim 11 wherein the halogen-containing polymer is polychloroprene.

18. The product of claim 11 wherein the halogen-containing polymer is chlorinated high density polyethylene.

19. A crosslinkable composition consisting essentially of (a) a halogen-containing polymer, (b) a basic material, and (c) a derivative of 2,5-dimercapto-1,3,4-thiadiazole selected from those derivatives having one of the following formulas:

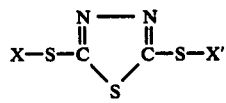

-continued

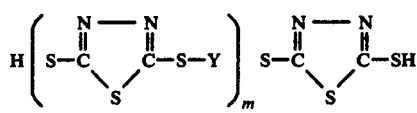

wherein X is a substituent selected from hydrogen, —CRR'OH, —(CH$_2$—CH$_2$—O)$_n$H, $$-(CH_2-\overset{CH_3}{\underset{|}{CH}}-O)_nH, -\overset{O}{\overset{\|}{C}}-R_2, -\overset{O}{\overset{\|}{C}}-NHR^2, -N\overset{R^3}{\underset{R^3}{\diagdown}}, \text{ and}$$

$$-N\overset{CH_2-CH_2}{\underset{CH_2-CH_2}{\diagdown\diagup}}O;$$

where n is an integer from 1 to 5, R and R' are selected from hydrogen, alkyl groups containing 1-8 carbon atoms, and aryl, alkaryl and aralkyl groups containing 6 to 8 carbon atoms; $R^2$ is selected from alkyl groups containing 1-17 carbon atoms, aryl groups containing one to two rings, alkaryl groups containing 7-14 carbon atoms, aralkyl groups containing 7-8 carbon atoms and cyclohexyl groups; $R^3$ is an alkyl group containing 1-8 carbon atoms; X' is the same as X with the exception of hydrogen; m is an integer from 1 to 10; and Y is selected from zinc, lead, —CRR'—, —CO—, —S—,

—SO$_2$—, —SS—,

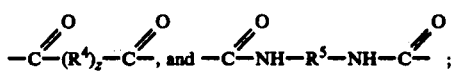

where $R^4$ is selected from alkylene and alkenylene groups containing 1-8 carbon atoms and cycloalkylene, arylene and alkarylene groups containing 6-8 carbon atoms; z is 0 or 1; and $R^5$ is selected from alkylene groups containing 2-8 carbon atoms, phenylene, methylphenylene and methylenediphenylene.

* * * * *

UNITED STATES PATENT AND TRADEMARK OFFICE
CERTIFICATE OF CORRECTION

PATENT NO. : 4,128,510

DATED : December 5, 1978

INVENTOR(S) : John R. Richwine

It is certified that error appears in the above-identified patent and that said Letters Patent are hereby corrected as shown below:

Col. 1, lines 55 & 56, " $-(CH_2-CH_1-O)_nH$ " should read -- $-(CH_2-CH_2-O)_nH$ --.

Col. 2, line 1, " 6 8 " should read -- 6 to 8 --.

Col. 2, line 8, insert " -CO- " after -- -CRR'- --.

Col. 3, line 13, " thadiazolyl " should read -- thiadiazolyl --.

Col. 4, line 2, " 2thiolterephthalate " should read -- 2-thiolterephthalate --.

Col. 4, line 11, " 1,3,4-thiadazole " should read -- 1,3,4-thiadiazole --.

Col. 5, line 34, " polyethylnen " should read -- polyethylene --.

Col. 5, lines 39 & 40, in both instances " haolgen " should read -- halogen --.

Col. 6, line 28, " degradtion " should read -- degradation --.

Col. 6, line 31, " unrective " should read -- unreactive --.

UNITED STATES PATENT AND TRADEMARK OFFICE
CERTIFICATE OF CORRECTION

PATENT NO. : 4,128,510

DATED : December 5, 1978

INVENTOR(S) : John R. Richwine

It is certified that error appears in the above-identified patent and that said Letters Patent are hereby corrected as shown below:

Col. 7, line 50, " cn " should read -- can --.

Col. 8, in the table of Example 2 between lines 55 & 60, after " Polymer plasticizer " delete the next line reading -- 52891 03/08/78 788395 08-1800 1 102 16.00 CH --.

Col. 9, line 19, " of rise " should read -- to rise --.

Col. 9, line 55, " derovatove pf " should read -- derivative of --.

Col. 9, lines 64 & 65, " 2.9hydrogen " should read -- 2.9% hydrogen --.

Col. 10, line 18, " compard " should read -- compared --.

Col. 10, in the first table of Example 9 between lines 35 & 45, " Carnon Black " should read -- Carbon Black --; " Carbnon Black " should read -- Carbon Black --; "Demethyldithiocarbamate " should read -- Dimethyldithiocarbamate --; and " Carnonate " should read -- Carbonate --.

UNITED STATES PATENT AND TRADEMARK OFFICE
CERTIFICATE OF CORRECTION

PATENT NO. : 4,128,510

DATED : December 5, 1978

INVENTOR(S) : John R. Richwine

It is certified that error appears in the above-identified patent and that said Letters Patent are hereby corrected as shown below:

Col. 11, line 53, " of the " should read -- had the --.

Col. 11, line 62, " a masterbatch " should read -- the masterbatch --.

Col. 11, line 65, " a " should read -- an --.

Col. 11, line 66, insert " ) " after -- D 2705-68T --.

Col. 14, second part of Table I re Physical Properties Examples 19 through 24 are incorrect.

"

| Physical Properties Examples | | | | | |
|---|---|---|---|---|---|
| 19 | 20 | 21 | 22 | 23 | 24 |
| 9 | 97 | 11 | 8 | 9 | 9 |
| 82 | 82 | 105 | 60 | 82 | 79 |
| 12.0 | 13.8 | 13.0 | | | |
| 13.0. | | | | | |
| 12.0. | | | | | |
| 14.0 | | | | | |
| 98 | 106 | 99 | 97 | 106 | 97 |
| 12 | 12 | 14 | 8 | 9 | 9 |

" should read --

| 19 | 20 | 21 | 22 | 23 | 24 |
|---|---|---|---|---|---|
| 9 | 9 | 11 | 8 | 9 | 9 |
| 82 | 82 | 105 | 60 | 82 | 79 |
| 12.0 | 13.0 | 12.0 | 14.0 | 13.8 | 13.0 |
| 98 | 106 | 99 | 97 | 106 | 97 |
| 12 | 12 | 14 | 8 | 9 | 9 |

--.

UNITED STATES PATENT AND TRADEMARK OFFICE
CERTIFICATE OF CORRECTION

PATENT NO. : 4,128,510

DATED : December 5, 1978

INVENTOR(S) : John R. Richwine

It is certified that error appears in the above-identified patent and that said Letters Patent are hereby corrected as shown below:

In the Claims, Col. 18, Claim 11, second structural formula, delete " a " between

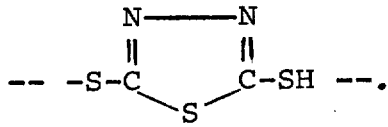

.

Signed and Sealed this

Third Day of April 1979

[SEAL]

Attest:

RUTH C. MASON
Attesting Officer

DONALD W. BANNER
Commissioner of Patents and Trademarks